United States Patent
Das et al.

(10) Patent No.: US 7,593,849 B2
(45) Date of Patent: Sep. 22, 2009

(54) NORMALIZATION OF SPEECH ACCENT

(75) Inventors: Sharmistha S. Das, Broomfield, CO (US); Richard A. Windhausen, Boulder, CO (US)

(73) Assignee: AVAYA, Inc., Basking Ridge, NJ (US)

( * ) Notice: Subject to any disclaimer, the term of this patent is extended or adjusted under 35 U.S.C. 154(b) by 1306 days.

(21) Appl. No.: 10/352,720

(22) Filed: Jan. 28, 2003

(65) Prior Publication Data

US 2004/0148161 A1    Jul. 29, 2004

(51) Int. Cl.
  *G10L 21/00* (2006.01)
(52) U.S. Cl. .......................... 704/224; 704/9
(58) Field of Classification Search .................. 704/224
  See application file for complete search history.

(56) References Cited

U.S. PATENT DOCUMENTS

| | | | | |
|---|---|---|---|---|
| 4,852,003 | A * | 7/1989 | Zamora | 704/8 |
| 5,012,518 | A * | 4/1991 | Liu et al. | 704/222 |
| 5,327,521 | A * | 7/1994 | Savic et al. | 704/272 |
| 5,473,666 | A * | 12/1995 | Szczebak et al. | 379/3 |
| 6,178,400 | B1 * | 1/2001 | Eslambolchi | 704/234 |
| 6,330,538 | B1 * | 12/2001 | Breen | 704/260 |
| 6,349,277 | B1 * | 2/2002 | Kamai et al. | 704/207 |
| 6,470,316 | B1 * | 10/2002 | Chihara | 704/267 |
| 6,499,014 | B1 * | 12/2002 | Chihara | 704/260 |
| 6,950,799 | B2 * | 9/2005 | Bi et al. | 704/261 |

OTHER PUBLICATIONS

Schwardt et al., ("Voice conversion based on static speaker characteristics", COMSIG'98, Proceedings of the 1998 South African Symposium on Communications and Signal Processing, 1998, pp. 57-62).*

Mizuno et al., ("Voice conversion based on piecewise linear conversion rules of formant frequency and spectrum tilt", ICASSP-94, 1994 IEEE International Conference on Acoustics, Speech, and Signal Processing, vol. 1, pp. 469-472).*

Abe et al., ("Cross-language voice conversion", ICASSP-90, 1990 IEEE International Conference on Acoustics, Speech, and Signal Processing, vol. 1, pp. 345-348).*

Gold et al., ("Speech transformations", Speech, Audio Signal Processing—Processing and Perception of Speech and Music, John Wiley & sons, Inc., 2000).*

* cited by examiner

*Primary Examiner*—David R Hudspeth
*Assistant Examiner*—Justin W Rider
(74) *Attorney, Agent, or Firm*—Douglas Grover

(57) ABSTRACT

A normalizer (100, 300) of the accent of accented speech modifies (210, 410) the characteristics of input signals that represent the speech spoken in an individual voice with an accent to form output signals that represent the speech spoken in the same voice but with less or no accent.

2 Claims, 2 Drawing Sheets

NORMALIZATION OF SPEECH ACCENT

TECHNICAL FIELD

This invention relates to automatic speech recognition and generation.

BACKGROUND OF THE INVENTION

It is often difficult for a listener to understand accented speech, that is, language spoken with an accent other than the "normal" accent.

The "normal" accent is also referred to as "unaccented" or "standard" speech as spoken by a native speaker of the language. In contrast, accented speech is the language as spoken by a non-native speaker for whom this is a second language. It would therefore be a significant improvement to the intelligibility of the accented speech if the effect of the accent could be alleviated.

SUMMARY OF THE INVENTION

This invention is directed to solving this and other problems and disadvantages of the prior art. According to the invention, the accent of accented speech is normalized to produce substantially unaccented speech. The speech is still in the voice of the speaker, but is unaccented, or at least less-heavily accented.

The invention enhances telephone conversations, especially those between people from different countries or non-native speakers who are using a common language (English, for example). It also helps to normalize speech prior to additional speech processing in a multi-stage process.

While the invention has been characterized in terms of method, it also encompasses apparatus that performs the method. The apparatus, preferably includes an effector—any entity that affects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more evident from the following description of an illustration embodiment of the invention considered with the drawing, wherein.

DETAILED DESCRIPTION

People develop an aboriginal speaking style up to about the age of 12, which consists of phoneme production, articulation, tongue and vocal-tract movement and perception of certain sound frequencies. Non-native speakers preserve this speaking style when learning a second language. Therefore, they substitute for a new hard-to-pronounce phoneme of the second language a similar phoneme of their native language (which is quite distinguishable by native speakers of the second language). Also, non-native speakers concentrate their efforts on following the native speakers' pronunciation patterns, and they rely on feedback from their auditory systems. Since human ears are more sensitive to low frequencies, non-native speakers are more successful in correcting their pronunciation in the lower-frequency part of the audible spectrum than in the higher-frequency part. The frequencies in the 1500-2500 Hz range, i.e., the frequencies in the second and third formants ($F_2$-$F_3$), are the best frequencies for assessing accent characteristics, as opposed to frequencies in the first formant ($F_1$), i.e., the 0-1500 Hz range.

Significant characteristics of accent are:

Word stop-release time.

Voice onset time.

Vowel duration.

Slope of the intonation contour (i.e., the slope of the fundamental frequency).

Shift of the second and third formants.

In a given sample of speech, if one detects a difference in one or more of these indicators from standard speech, one can recognize that speech as accented speech. The desire is to alter some or all of these indicators back to their standard form to make the speech sound more like standard, "unaccented," speech (i.e., to normalize the accent).

Figure 1:
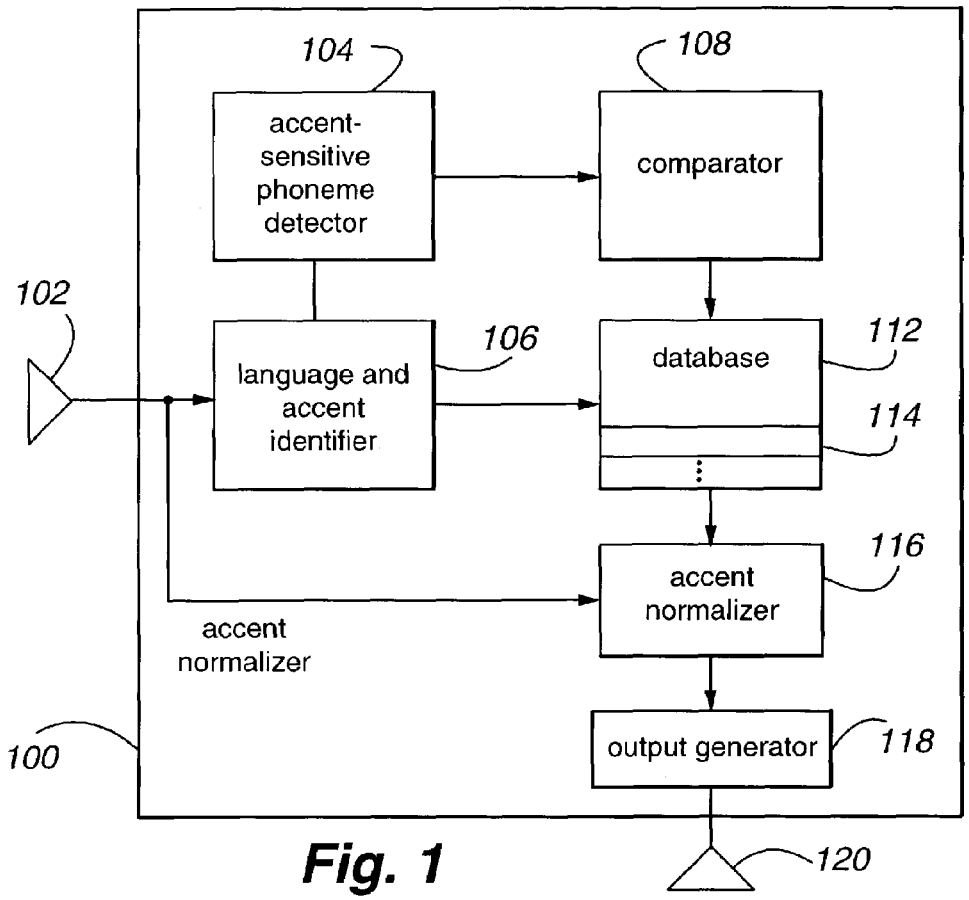
FIG. 1 is a block diagram of a first illustrative embodiment of an accent normalizer.

FIG. 1 shows a first illustrative embodiment of an accent normalizer 100 that effects the above-described function. It comprises an audio input 102—a telephone line, for example, or a microphone—connected to a language and accent identifier 106 and an accent normalizer 116. Input 102 conveys signals representing accented speech. Identifier 106 recognizes the language in, and the accent with, which the speech is spoken. Output of identifier 106 is connected to a database 112 to select therefrom contents pertaining to the identified accent and language, and to an accent-sensitive phoneme detector 104. Detector 104 identifies accented phonemes in the signals representing the accented speech. Output of detector 104 is connected to a comparator 108. Comparator 108 selects, from database 112 contents that were selected by identifier 106, the contents that correspond to the accented phonemes identified by detector 104. The contents of database 112 illustratively comprise database entries 114 each comprising an accent-affected phoneme in a language and an accent, and the corresponding unaccented phoneme or the rules for forming the unaccented phoneme in that language. Entries 114 selected by identifier 106 and comparator 108 are output by database 112 to accent normalizer 116. Normalizer 116 then uses the unaccented phonemes from the received entries 114 to change the accented phonemes in the received speech sample to the unaccented phonemes, and supplies the unaccented speech sample which is thus formed to an output generator 118. Generator 118 outputs unaccented speech on an audio output 120—such as a data bus or a serial interface, for example, for connection to a telephone, speaker interface circuitry, or additional processing circuitry.

The elements 102-120 maybe discrete elements, or alternatively they may be implemented as programmed functions stored in any suitable storage of a stored-program controlled machine such as a computer or a digital signal processor (DSP). Database 112 may be either an external or an internal component of accent normalizer 100.

Figure 2:
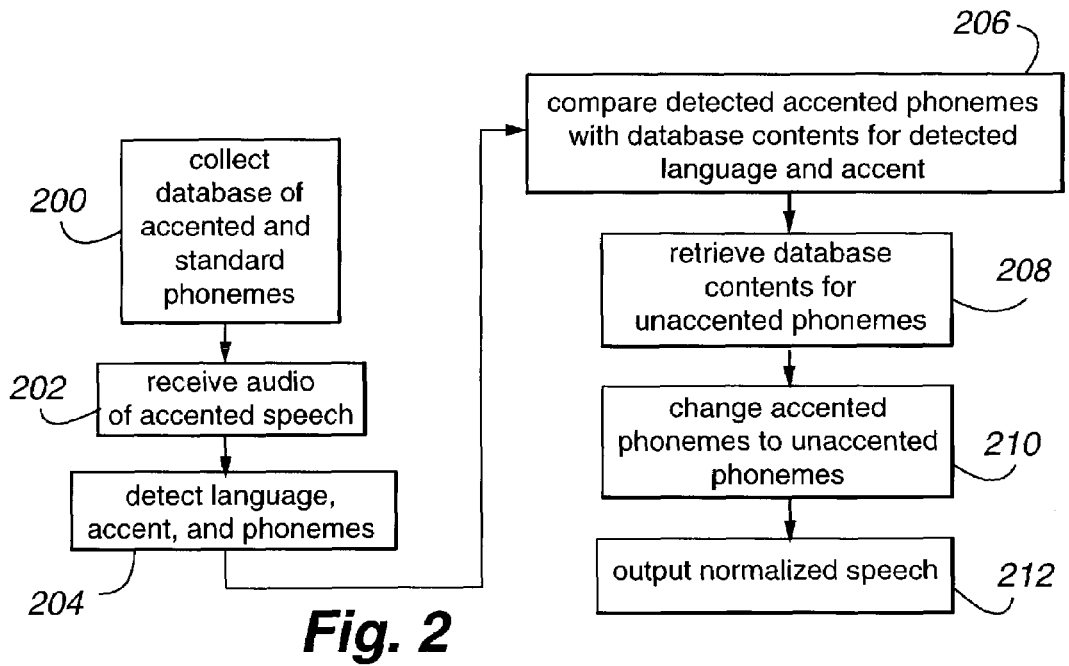
FIG. 2 is a functional flow diagram of the configuration and operation of the accent normalizer of FIG. 1.

Accent normalizer 100 is configured and functions as shown in FIG. 2. First, database 112 is created in a data store, at step 200, by collecting samples of accented and corresponding unaccented, standard, phonemes in each accent and language of interest. Contents of database 112 may alternatively be based on partial words or phonemes. Alternatively, instead of comprising pairs of accented and unaccented phonemes, entries 114 of database 112 may comprise accented phonemes and rules for changing the accented phonemes into their unaccented equivalents. These rules generally comprise rules for changing the length of vowels, changing the pitch contour, and changing the word stop-release time. Illustratively, database 112 is segmented into a plurality of databases, one for each accent-and-language pair of interest.

Once database 112 is created, accent normalizer 100 is ready to be put to use. Audio samples—spoken words of accented speech—are received over audio input 102 from the speaker of the words, i.e., the person who is speaking the words, at step 202. The language that is being spoken, the accent with which it is being spoken, and the accented phonemes of the audio samples are detected, at step 204. The detected language, accent, and phonemes are used to identify, at step 206, and to retrieve, at step 208, the corresponding database contents. The retrieved database contents are then used by accent normalizer 116 to normalize the received speech samples to turn them into normalized, unaccented, speech spoken in the voice of the speaker, at step 210. The normalized speech is then output by output generator 118 at output 120, at step 212.

Figure 3:
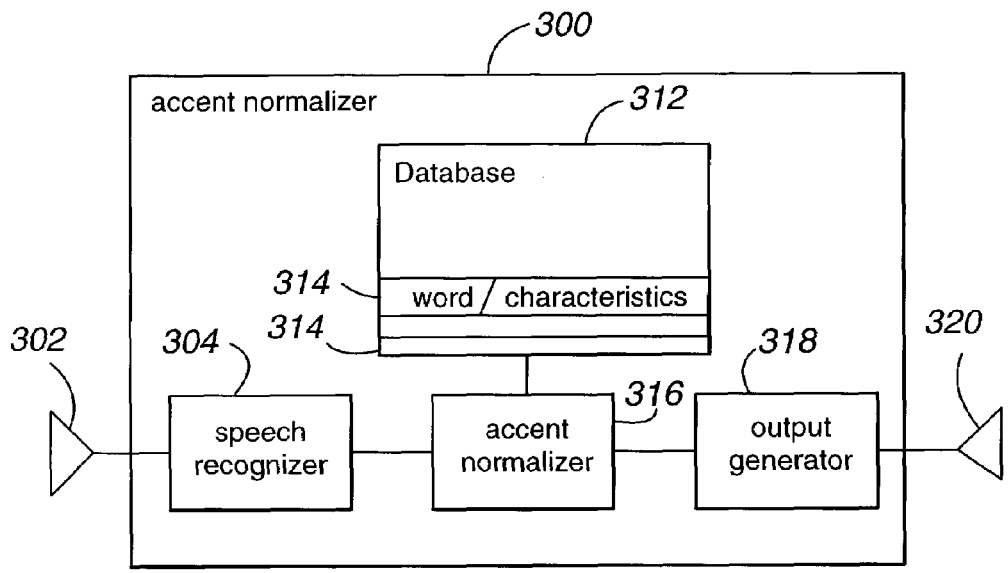
FIG. 3 is a block diagram of a second illustrative embodiment of the accent normalizer.

FIG. 3 shows a second illustrative embodiment of an accent normalizer 300. It comprises an audio input 302 connected to a speech recognizer 304, whose output is connected to an accent normalizer 316, whose output is in turn connected to an output generator 318. The output of generator 318 appears on an audio output 320. Normalizer 316 is also connected to a database 312 of accent-normalization data. The elements 302-320 may be discrete elements, or alternatively they may be implemented as programmed functions stored in any suitable storage of a stored-program-controlled machine such as a computer or a digital signal processor (DSP). Database 312 may be either an external or an internal component to accent normalizer 300.

Figure 4:
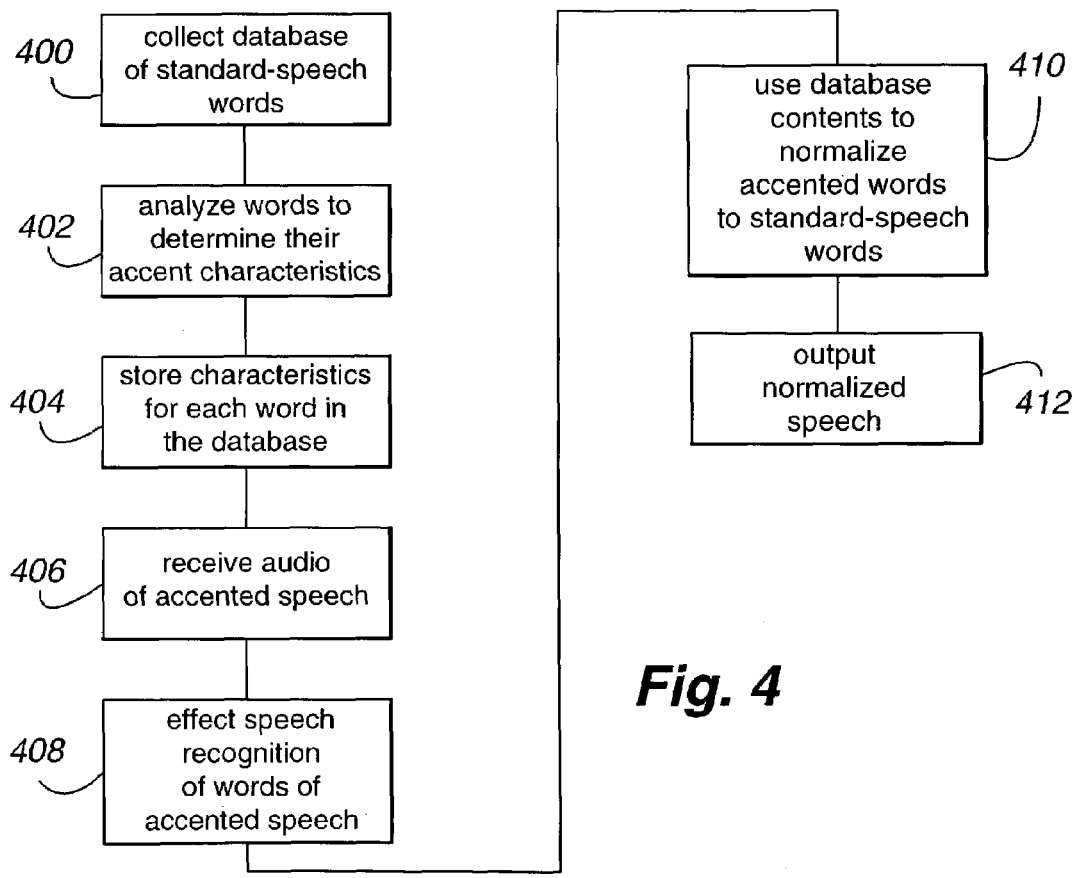
FIG. 4 is a functional flow diagram of the configuration and operation of the accent normalizer of FIG. 3.

Accent normalizer 300 is configured and functions as shown in FIG. 4. First, database 312 is created in a data store, at steps 400-404. Signals representing standard-speech, "unaccented," words are collected and stored in database 312, at step 400. The signals representing each word in database 312 are then analyzed to determine its accent characteristics, at step 402. The characteristics of each word that are determined in this illustrative example are the conventional speech characteristics of voice onset time, vowel duration, and stop-release time. Additional characteristics may be determined and used as well. The determinations may be effected in a conventional manner. The results of the analysis are stored in database 312 with their corresponding words, at step 404, so that database 312 comprises a plurality of entries 314 each corresponding to a different one of the unaccented words and storing that word's corresponding accent characteristics.

An alternative implementation involves populating database 312 with normalization rules for normalizing speech that is accented in various accents, instead of the accent characteristics of individual words.

Once database 312 has been created, accent normalizer 300 is ready for use. Audio samples—spoken words—of accented speech are received over audio input 302 from the speaker of the words, i.e., the person who is speaking the words, at step 406, and are fed into speech recognizer 304. Speech recognizer 304 performs speech analysis to recognize the spoken accented words, at step 408. Speech recognizer 304 may also include a language recognizer that recognizes the spoken language. An illustrative speech recognizer 304 is described in patent application of S. Das et al., entitled "Arrangement for Real-Time Automatic Recognition of Accented Speech," U.S. application Ser. No. 10/269,725, filed on Oct. 11, 2002 and assigned to the same assignee as this application, which is thereby incorporated herein by reference. Signals that form the recognized accented words along with their identifying information are fed from speech recognizer 304 to accent normalizer 316. Normalizer 316 analyzes the identifying information, accesses each word's corresponding entry 314 from database 312, and uses the accent characteristics that are stored therein to normalize the appropriate signals within the accented word to produce signals that form the equivalent but substantially unaccented word, at step 410. Normalizer 316 does this by adjusting the accent characteristics of the signals that form the accented words to match those of the unaccented words that were retrieved from database 312. In this illustrative example, normalizer 316 adjusts the length of the voice onset time, vowel duration, and word stop-release time of the accented word to match those of the unaccented word. If database 312 is populated with rules for forming unaccented words, accent normalizer 316 applies the rules for whichever accent is recognized by speech recognizer 304 to the recognized accented words to produce their standard equivalents.

While signals that form the unaccented words from a database (e.g., database 312) could simply be substituted for the accented words, that would produce speech in a different voice from the voice of the speaker of the accented words. The use of normalizer 316 has the significant benefit of producing unaccented, or less-heavily accented, speech in the voice of the original speaker of the accented words.

Having normalized the accent, normalizer 316 outputs the signals that form normalized words to output generator 318, which generates and transmits the words on output 320, at step 412.

Of course, various changes and modifications to the illustrative embodiment described above will be apparent to those skilled in the art. For example, database entries may be populated with information representing a second accent, so that the accent normalizer converts speech from a first accent to a second accent. Rules for normalizing the speech may also include rules for frequency shift and speech rate (speed up/slow down). The accent normalizer may include a context override, wherein accent normalization is omitted or modified in certain situations. Also, normalization may be implemented algorithmically, as opposed to by accessing a database. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of normalizing the accent of accented speech, comprising:

receiving input signals representing words spoken with an accent; and modifying characteristics of the input signals that represent the accent via a processor to form output signals representing the words spoken with less said accent, wherein the characteristics comprise voice onset time, vowel duration, and word stop-release time.

2. An apparatus for normalizing the accent of accented speech, comprising:

a receiver of input signals representing words spoken with an accent; and a modifier of characteristics of the input-signals that represent the accent, the modifier forming output signals representing the words spoken with less said accent, wherein the characteristics comprise voice onset time, vowel duration, and word stop-release time.

* * * * *